US006298419B1

(12) United States Patent
Kontothanassis et al.

(10) Patent No.: US 6,298,419 B1
(45) Date of Patent: Oct. 2, 2001

(54) PROTOCOL FOR SOFTWARE DISTRIBUTED SHARED MEMORY WITH MEMORY SCALING

(75) Inventors: Leonidas Kontothanassis, Belmont; Rishiyur Nikhil, Arlington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/048,231

(22) Filed: Mar. 26, 1998

(51) Int. Cl.[7] .............................. G06F 12/00; G06F 13/00
(52) U.S. Cl. ..................... 711/147; 711/148; 711/150; 711/156; 711/159
(58) Field of Search ................................ 711/147, 148, 711/133, 141, 150, 156, 159, 160

(56) References Cited

U.S. PATENT DOCUMENTS

| | | | |
|---|---|---|---|
| 5,269,013 | * | 12/1993 | Abramson et al. ............... 395/425 |
| 5,274,789 | * | 12/1993 | Costa et al. ..................... 395/425 |
| 5,535,116 | * | 7/1996 | Gupta et al. ..................... 364/134 |
| 5,692,149 | * | 11/1997 | Lee ................................. 395/460 |
| 5,727,150 | * | 3/1998 | Laudon et al. ................ 395/200.08 |
| 5,734,922 | * | 3/1998 | Hagersten et al. ........... 395/800.37 |
| 5,918,249 | * | 6/1999 | Cox et al. ......................... 711/203 |
| 5,987,506 | * | 11/1999 | Carter et al. ..................... 709/213 |

FOREIGN PATENT DOCUMENTS

90/00283 * 1/1990 (WO) ................................ 12/8

OTHER PUBLICATIONS

Dubois et al., IEEE Transactions on Computers, vol. 38, No. 8, "Dynamic Page Migration in Multiprocessors with Distributed Global Memory", Aug. 1989.*

* cited by examiner

*Primary Examiner*—Do Hyun Yoo
*Assistant Examiner*—Kimberly McLean
(74) *Attorney, Agent, or Firm*—Leah Sherry; Oppenheimer, Wolff & Donnelly LLP

(57) ABSTRACT

A method and apparatus for providing additional memory storage within a local node associated with shared memory system is disclosed. A processor associated with a local node of the shared memory system initially requests a fetch operation to a local memory associated with the processor of a first group of data from the home node location of the first group of data. The processor determines whether sufficient local memory exists for receiving the requested first group of data, and if not, selects a second group of data presently located within the local memory for removal in such a manner that no data will be lost due to the removal of the second group of data from the local memory. The selected second group of data is removed from the local memory and any directory information relating to said second group of data updated to reflect any new location information. The first group of data may then be fetched to the local memory.

27 Claims, 7 Drawing Sheets

PROTOCOL FOR SOFTWARE DISTRIBUTED SHARED MEMORY WITH MEMORY SCALING

BACKGROUND OF THE INVENTION

1. Technical Field of the Invention

The present invention relates to shared memory network architectures, and more particularly, to a method for memory scaling when encountering memory shortages within a node of a software coherent network.

2. Description of Related Art

Distributed shared memory provides an important; compromise between the low cost of distributed memory machines and the convenient paradigm afforded by shared memory multiprocessors. Software shared memory has received much attention for both clusters of uniprocessors and clusters of multiprocessors. Existing designs of coherent shared memories and implementations of software shared memories treat local memory of a node as a third level cache and migrate and replicate shared data in that space. This approach, however, while simplifying the implementation of the coherence protocol results in the unfortunate side effect of preventing the total amount of shared memory available to the application from scaling with the size of the cluster. Adding additional nodes to the cluster increases the computational power of the overall cluster but does not increase the amount of shared memory which is available to the application. A significant number of applications require very large shared memories and while these applications may scale well under software coherence they cannot take full advantage of clustered environments due to memory limitations.

The primary reason behind the lack of memory scaling is that software distributed shared memories have not beer. designed to handle evictions of shared data. This results in the total amount of shared memory available being limited by the amount of memory which can be cached. The amount of memory which can be cached in turn is limited by the amount of memory available on the individual nodes within the cluster.

Race conditions between requests for data and data evictions complicate the coherence protocol. Furthermore, evicting data may completely eliminate it from the system and, therefore, steps must be taken when evicting data to ensure that a copy of the data remains in the system. Finally, evicting data from a node requires the updating of metadata which indicates to other nodes where the application data reside. Such updates need to be extremely efficient in order that they not degrade system performance.

OBJECTS OF THE INVENTION

Accordingly, it is an object of the present invention to provide a protocol which implements the efficient eviction of data from a coherent shared memory system in a multiprocessor architecture.

It is also an object of the present invention that such a protocol provide efficient notification to all nodes in the multinode architecture when data is being evicted or migrated.

It is still further an object of the present invention to provide further advantages and features, which will become apparent to those skilled in the art from the disclosure, including the preferred embodiment, which shall be described below.

SUMMARY OF THE INVENTION

The present invention overcomes the foregoing and other problems with a method and apparatus for providing additional memory storage within a local node that is a part of a shared memory system. A communications network enables communications to be carried on between each node of the system. The shared memory system includes a local memory associated with each node of the system. The local memory stores a plurality of groups of data referred to as pages. A directory associated with each node includes status information for each page of data stored within the shared memory system. The status information includes a variety of data concerning the state of a particular page. A Read-only bit indicates whether a copy of a page has only read-only privileges. Read-write bits indicate whether a copy of a page has read or write privileges. A difference bit indicates whether a node is writing differences of a particular page to the home node. A fetch bit indicates whether a node is attempting to fetch a page from its home node location, and eviction and migration bits indicate whether a home node of the page is being evicted or moved for other reasons.

At least one processor associated with each node of the network is configured to provide additional storage space within a local node by the eviction or movement of pages presently stored in local memory in the following manner.

Upon generation of a request for a fetch operation by the processor of a copy of a first group of data (page) from a home node location within the shared memory system, a determination is made as to whether sufficient local memory exists for receiving a copy of the first group of data. If sufficient memory does not exist, a second group of data within the local memory is selected for removal. The second group of data is selected such that removal of the second group of data does not cause the loss of any of the removed data from the shared memory system. If the local memory includes an only existing read-only copy of a group of data for which the local node is not a home node, this data is selected f or removal. If no read-only copy exists, the processor next searches for and selects a modified copy of a group of data within the local memory for which the local node is not a home node. If this too may not be found, a random group of data is selected for removal. This order of search is the preferred order, but other orders are possible. The mechanisms described herein can deal with any order and any type of page selected for eviction.

After a second group of data has been selected for removal, a determination is made whether the local node is the home node for the selected group of data. If the local node is not the home node, any modifications which have been made to the second group of data are determined and written back to the home node of the second group of data prior to removal. If the local node is the home node for the second group of data, the status information for the second group of data is updated to indicate that the home node location for the data is about to be changed. A waiting period may be implemented until all active operations involving the second group of data are completed. Once the active operations involving the second group of data are completed, the second group of data is written to a new home node location and directory information relating to the second group of data is updated to indicate the new home node location of the data. Once the second group of data has been removed, the first group of data may be fetched to local memory using the space vacated by the second group of data.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
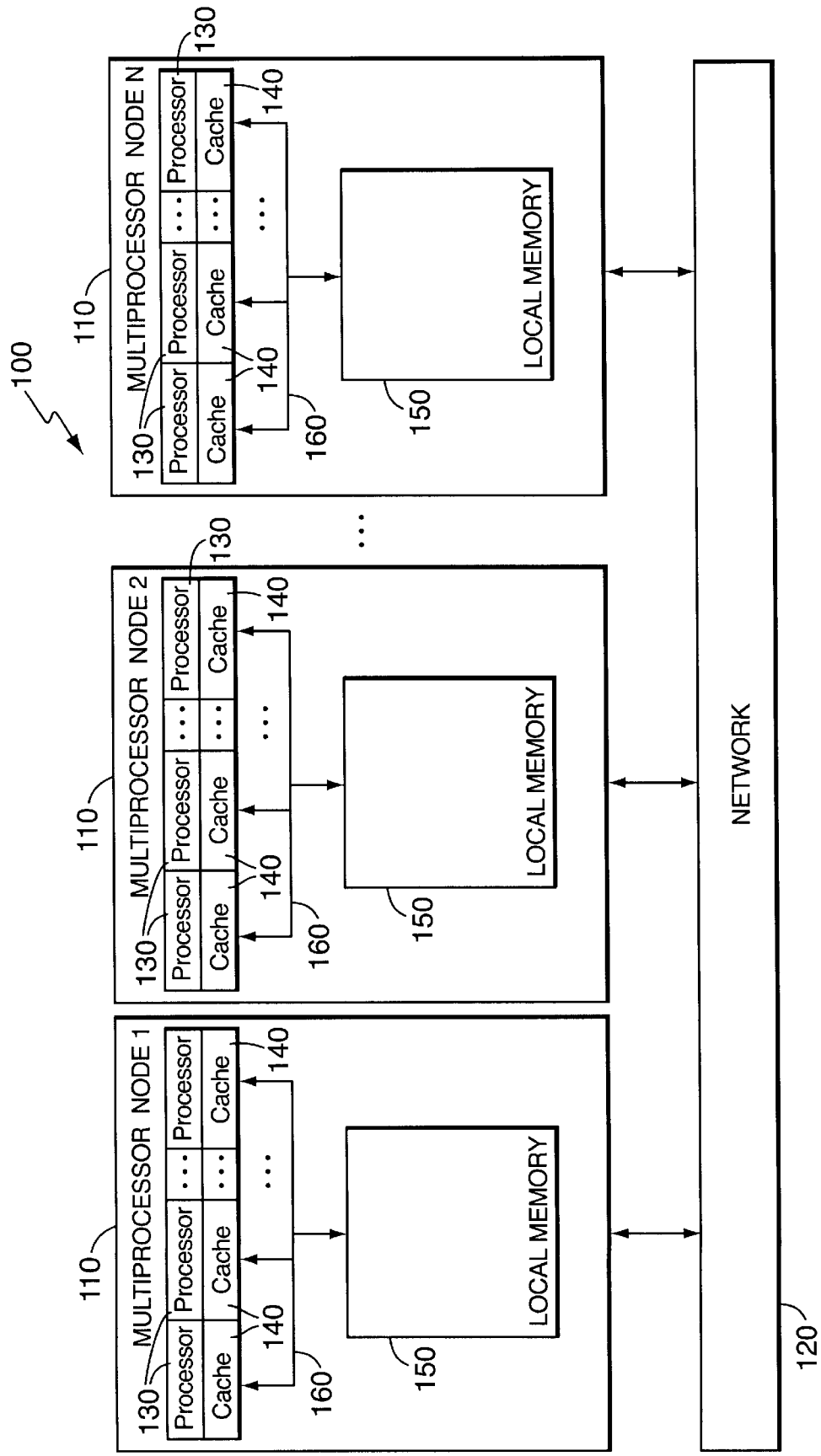
FIG. 1 illustrates a functional block diagram of a multinode cluster of processors in which an embodiment of the present invention is operable.

Referring now to the drawings, and more particularly to FIG. 1, a multinode network is shown generally at 100. The network 100 comprises a plurality of nodes 110 communicating with each other via a communication network 120. The communication network 120 preferably comprises a high speed, low latency network, but may comprise any type of network enabling communications between the nodes 110. Each node 110 includes a plurality of processors 130 associated with a plurality of cache memories 140 and a local memory 150. The plurality of processors 130 of a given node 110 communicate with the local memory 150 via a communication bus 160. The local memory 150 of each of the respective nodes 110 is shared by the plurality of processors 130 of the respective nodes 110 by implementing hardware coherency techniques commonly known in the industry.

Figure 2A:
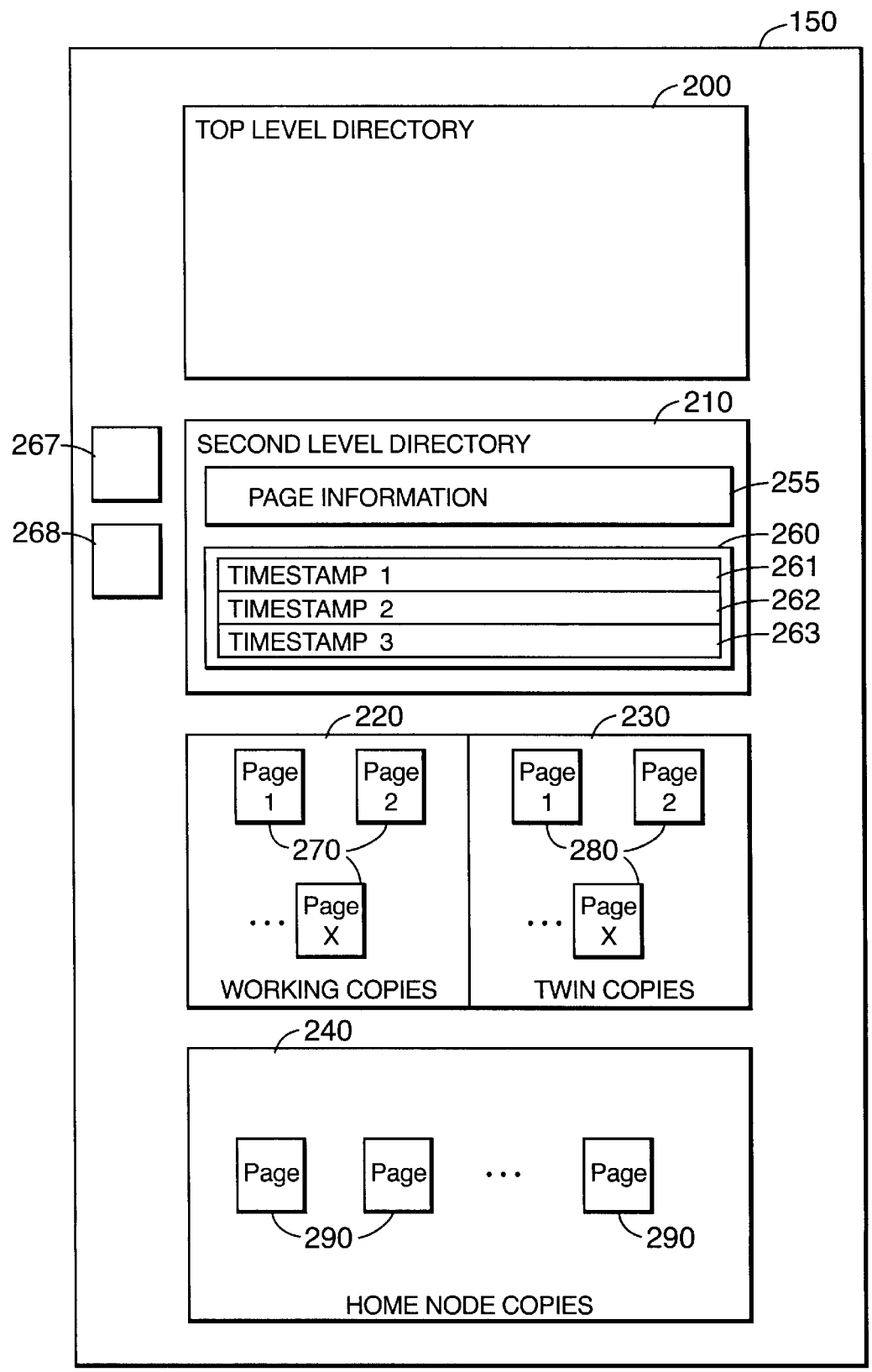
FIG. 2A illustrates a functional block diagram of a local memory illustrated in FIG. 1 shown in greater detail.

Referring now also to FIG. 2A, there is illustrated a functional block diagram of a local memory 150 associated with a node 110. The local memory 150 includes a top level directory 200, a second level directory 210, a working copy storage area 220, a twin copy storage area 230 and a home node page storage area 240. The working copy storage area 220, twin copy storage area 230 and home node page storage area 240 store pages of data accessible by each of the nodes 110. A page comprises a unit grouping of data accessible by a node 110.

The working copy storage area 220 of the local memory 150 stores working copies 270 of pages currently being accessed by the processors 130 of a particular node 110. The working copies 270 may be modified by the processors 130 during write operations. The twin copy storage area 230 contains pages comprising twin copies 280 of working copies 270 of pages currently located in the working copy storage area 220. The twin copies 280 are not created until an associated working copy 270 is modified by a processor 130. The twin copies 280 are not modified by the processors 130 in an ongoing basis but are duplicate copies of the working copies 270 made prior to any modifications or updates by the processors 130 of the working copies. A twin copy 280 is maintained whenever at least one local processor 130 has write permission for a page and the page is not accessed exclusively by the local node 110 or a single processor 130. Twin copies 280 are not initially created with the working copies 270 but are created once the working copy 270 is first: modified. The twin copies 280 are modified by the processors 130 of the particular node 110 in which they reside.

The home node page storage area 240 of the local memory 150 contains home node copies 290 of pages. A home node copy 290 of a page comprises the master copy of a page to which all modifications must eventually be made. There is only line home node copy 290 for each page, and a home node copy may be stored within a home node page storage area 240 of any node 110. Thus, the total contents of the home node page storage areas 240 for each node 110 comprise all of the pages which may be accessed by the network 100. Each node 110 may have a home node page storage area 240 containing any number of home node copies 290 of pages up to the total number of existing pages.

Figure 3:
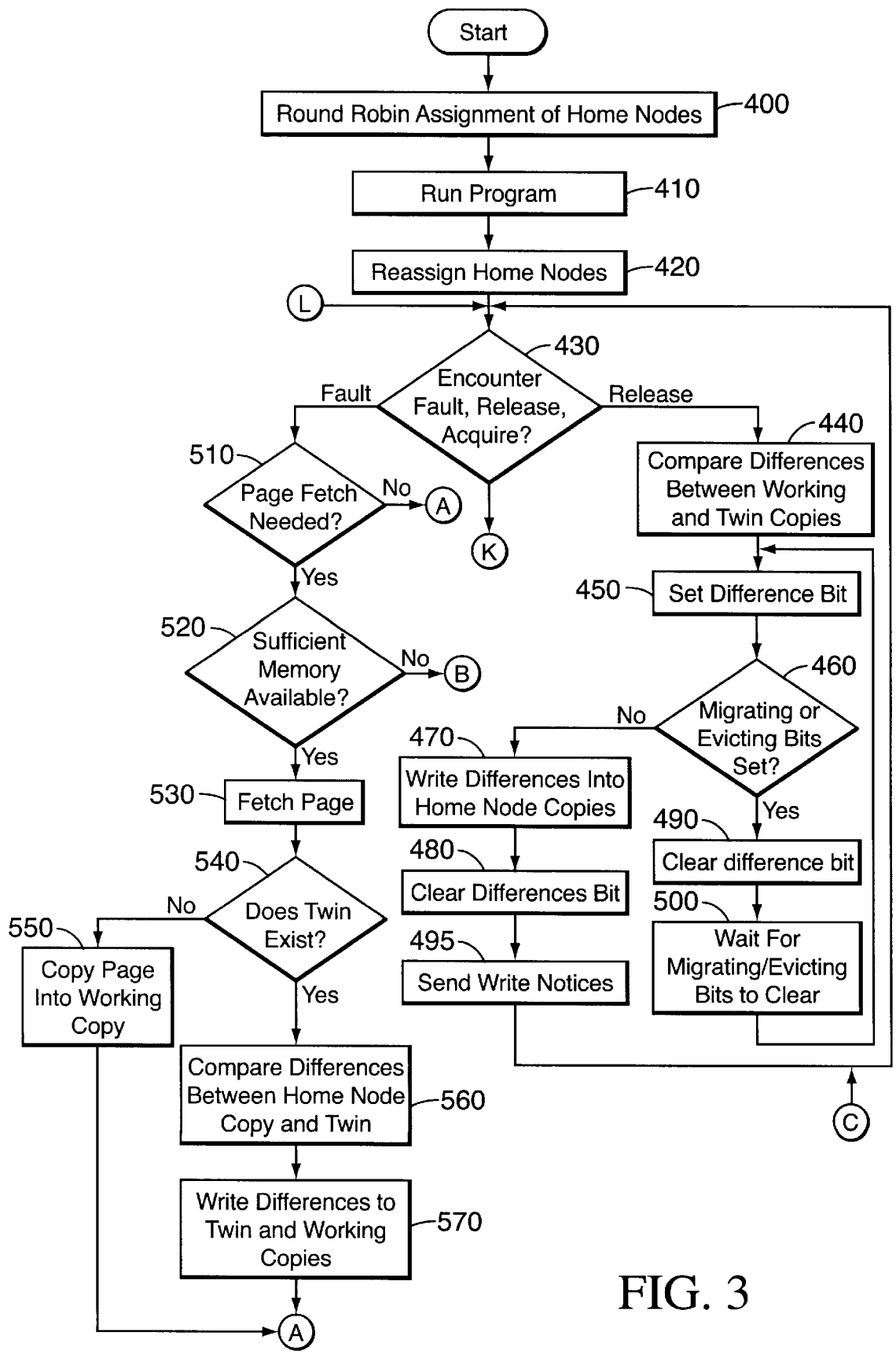
FIGS. 3, 4, 5, 6 and 7 illustrate a method flow diagram listing the method steps of a method of operation of an embodiment of the present invention.
Figure 4:
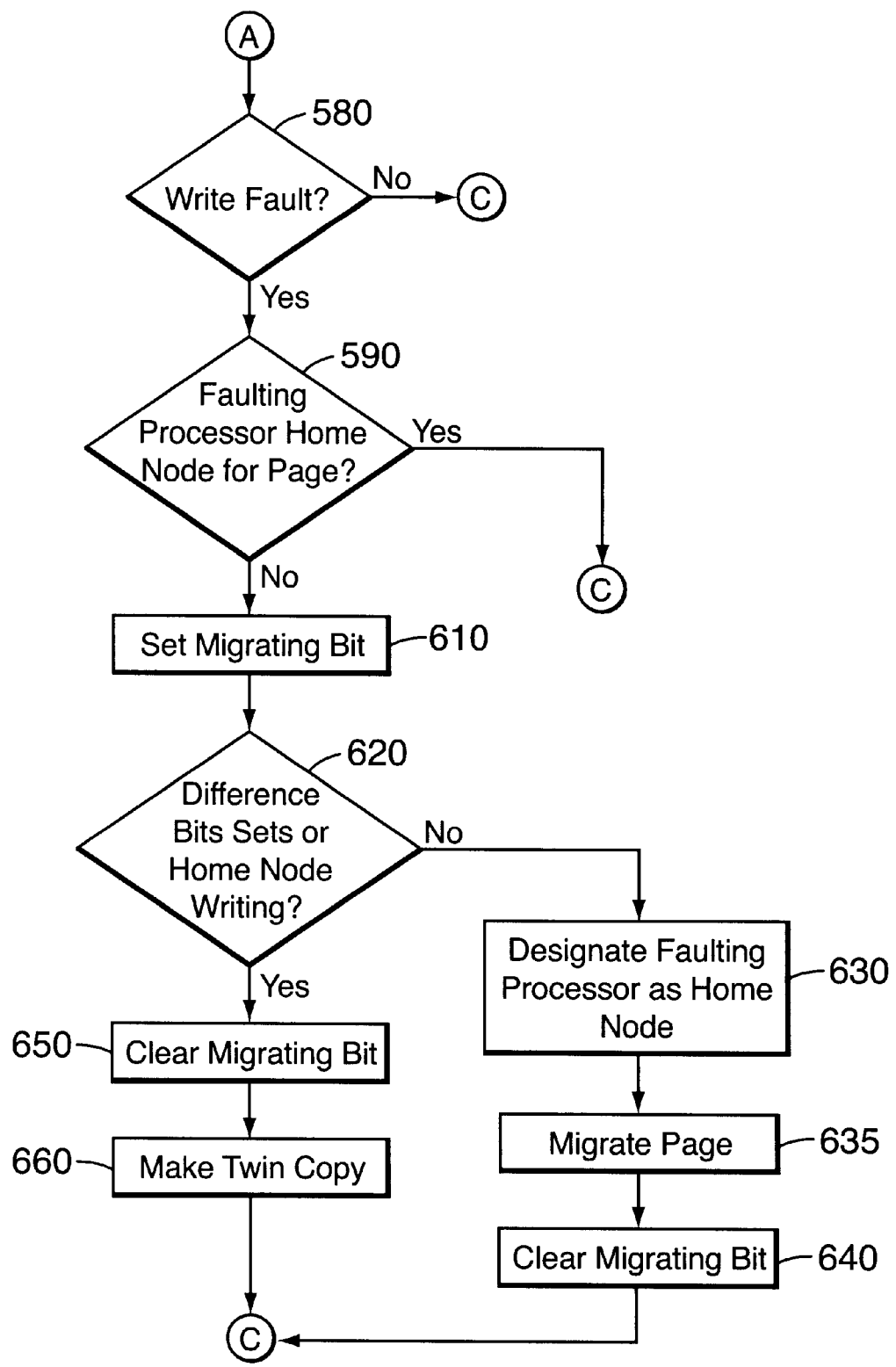
Figure 5:
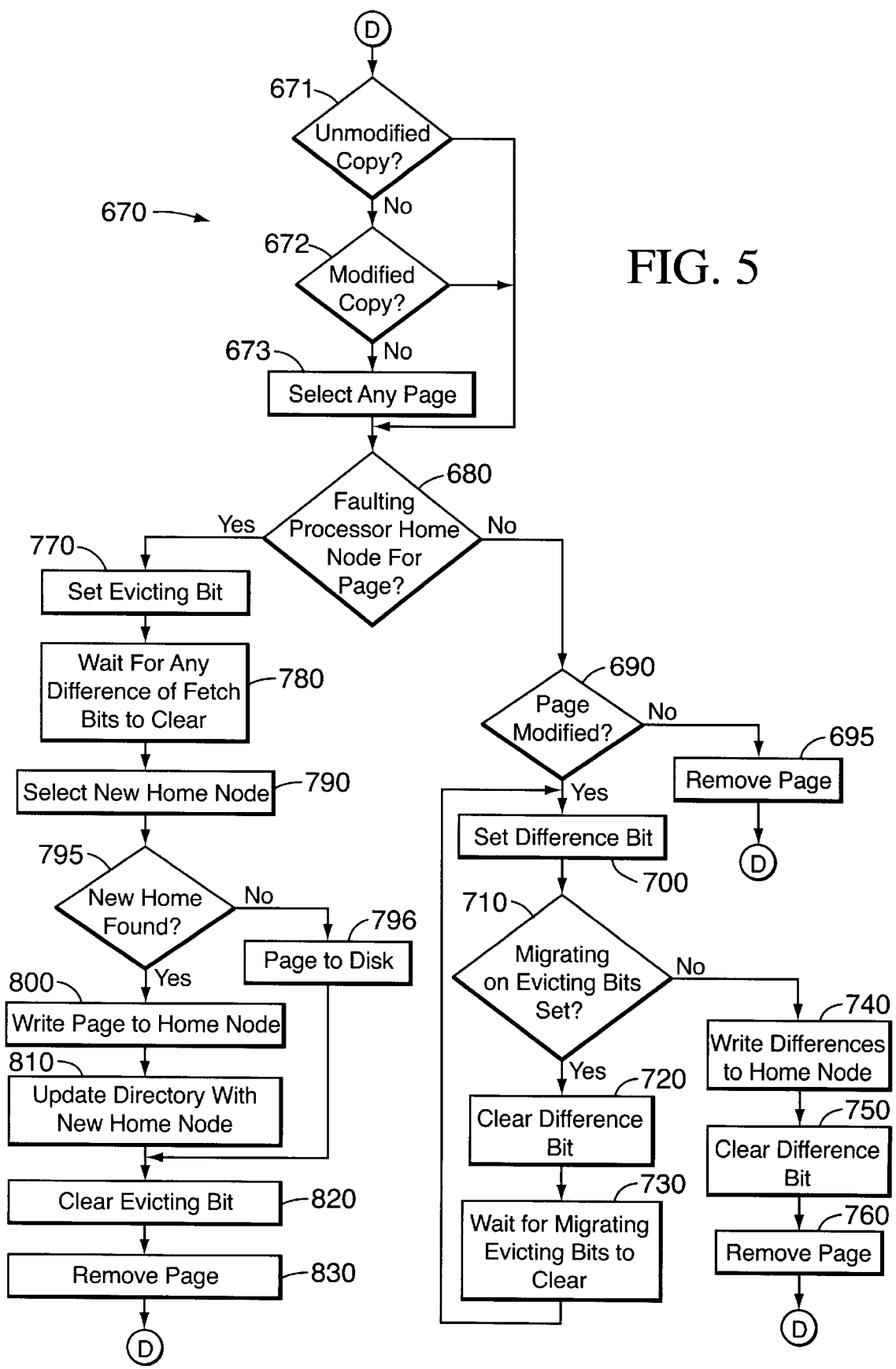
Figure 6:
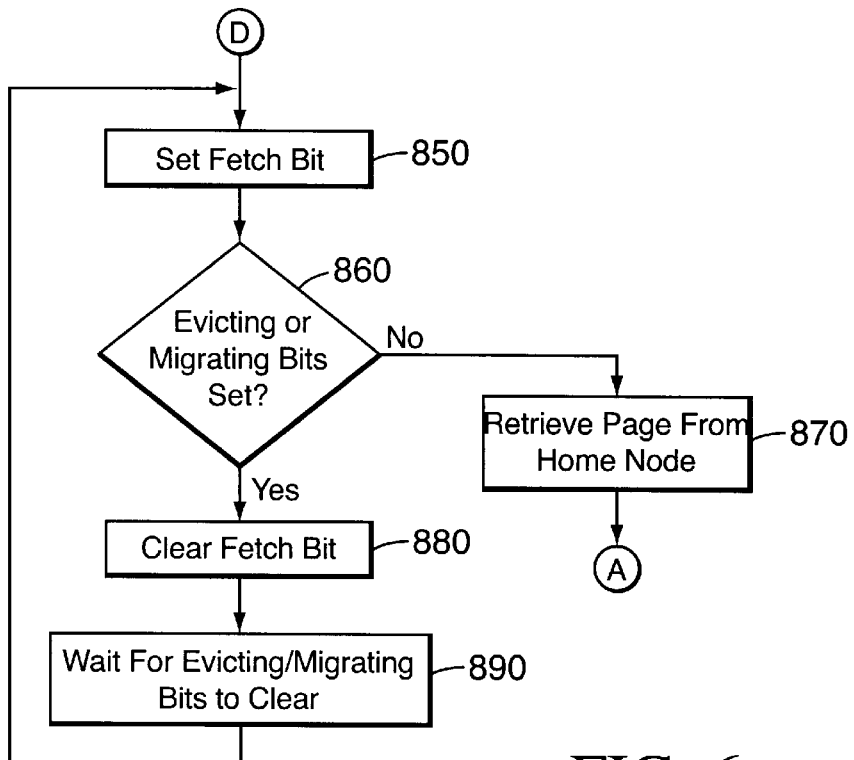
Figure 7:
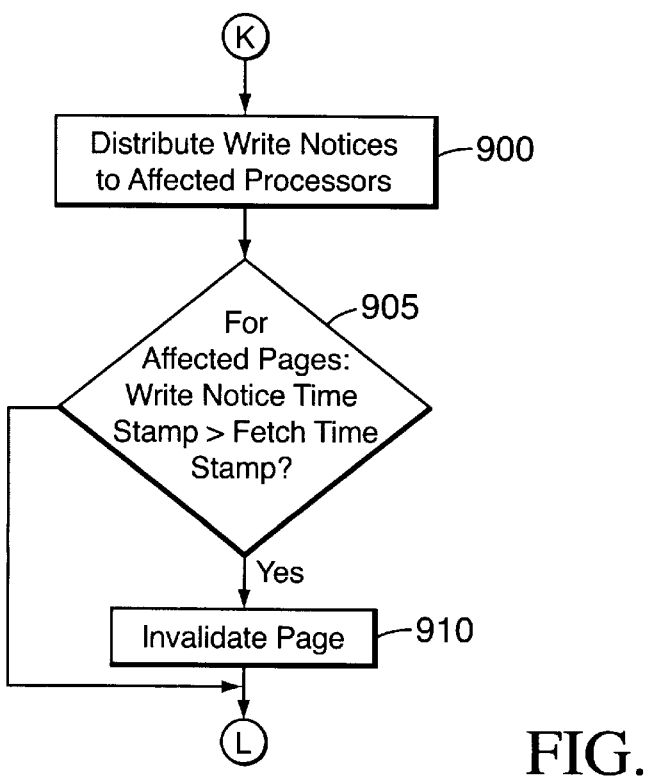

Every shared page has a distinguished home node copy 290 resident in the local memory 150 of one of the nodes 110. When a program is loaded into the network of nodes 100 the home node copies 290 of the pages are initially assigned in a round robin manner to the local memories 150 of the nodes 110. Thereafter, the home node copies 290 are reassigned to the local memory 150 of the node 110 whose processor 130 first accesses the associated page. After the pages are assigned in a round robin fashion and subsequently reassigned to the processor 130 which first accesses the page (as will be more fully discussed with respect to FIG. 3), the pages may be assigned to different processors 130 depending on their usage. For example, if the local memory 150 of one of the nodes 110 has insufficient memory to store a new page, an existing page must be evicted to make room for the new page. The evicted page is moved to one of the other local memories 150 within the network. Pages may also be migrated between nodes 110 based on the frequency with which they are accessed by the nodes 110 to the node 110 most frequently accessing the page.

To keep track of which nodes 110 have working copies 270, twin copies 280 and home node copies 290 of pages, the present invention, maintains a distributed directory structure. A top level (home node) directory 200 is maintained in the local memory 150 of each node 110. Each page is represented in the top level directory 200 which contains information about the page and processors which have access to the page. The top level directory will be described in greater detail in FIG. 2B.

The second level directory 210 contains page information identifying which processors 130, within a node 110, have invalid, read only and read/write mappings of a page. The second level directory 210 also includes a set of time stamps 260 for each page. A first time stamp 261 identifies a completion time of the last flush operation for a page. A second time stamp 262 identifies a completion time of the last update or fetch operation for a page, and a third time stamp 263 identifies the time the most recent write notice was received for a page. This information is repeated for each page stored on the node.

To avoid the need to update remote time stamps when transmitting write notices which would require global locks on processed pages, the processors 130 check to see if any write notices have arrived and time stamps them at that point. Thus, although the processor 130 does not know the precise time that the write notice arrived, it is assured that the write notice arrived no later than the time contained in the third time stamp 263. In addition to the set of time stamps 260 for each page, each node 110 maintains the current time 267 and the time of the most recent release 268 by any processor 130. The current time 267 is incremented every time an acquire or release operation begins, every time local changes are made to the home node copies 290 or vice versa, or whenever a arrival of a write notice is detected.

The present invention uses currently available hardware implemented coherence techniques within each of the nodes 110 to enable all processors 130 in a given node to have access to the same shared data and share physical pages of the working copy storage area 220, the twin copy storage area 230 and the home node page storage area 240 via the communication bus 160. Across nodes 110, the present invention uses software enabled by virtual memory protection to implement coherence for page-size blocks. Shared pages are copied from the home node to the nodes 110 that are currently reading or writing them. Multiple processors 130 within the nodes 110 may have a write mapping for a page with writeable copies existing on multiple nodes 110. Programs operating on the present invention adhere to a data-race-free programming model in which all accesses to shared pages are protected by locks and barriers.

Figure 2B:
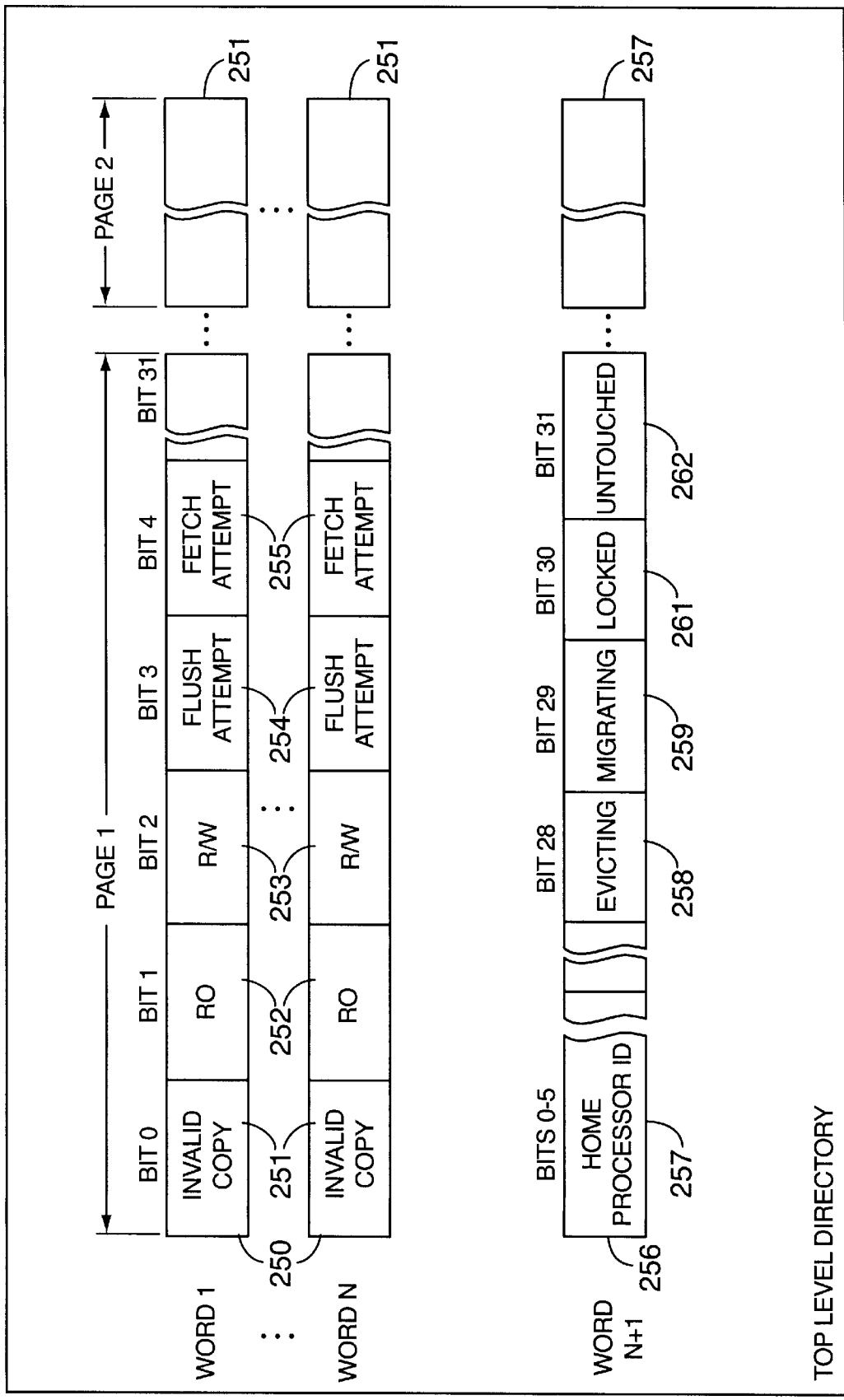
FIG. 2B illustrates a functional block diagram of a directory illustrated in FIG. 2A shown in greater detail.

Referring now also to FIG. 2B, there is illustrated the top level directory 200 of FIG. 2A, shown in greater detail. The top level directory 200 contains N+1 words 250 for each page contained within all the nodes 110. N equals the number of nodes 110 in the network 100. Each word 250 contains information pertaining to a single copy of a page on a single node 110. The information pertaining to the copy is presented as a number of bits which are set ("1") or not set ("0") depending on the information being presented on the page. Bit zero 251 of a word 250 indicates when the node 113 associated with the copy of the page has an invalid copy of the page. Bit one 252 indicates when the node 110 associated with the copy of the page has a read only copy of the page. Bit two 253 indicates when the node 110 associated with the copy of the page has a read/write copy of the page. Bit three 254, a difference bit, indicates when a processor 130 within the node 110 associated with the copy of the page is attempting to perform a flush operation such as writing differences from the copy of the page into the home node copy 290 of the page. Bit four 255 indicates when a processor 130 within the node 110 associated with the copy of the page is attempting to fetch the home node copy 290 of the page.

The top level directory 200 further includes an additional word 256 for each page of the shared memory. Bits zero through five 257 identify the location of the home node copy 290 of the page associated with the word 256. Bit twenty eight 258 indicates when a home node copy 290 of the page associated with the word 256 is being moved to another memory location as a result of an eviction. Bit twenty nine 259 indicates when a home node copy 290 of the page associated with the word 256 is migrating to another memory location. Bit thirty 261 indicates when the home node copy of the page is locked and may not be processed by a write operation. Bit thirty one 262 indicates when the page associated with the word 256 has not been yet accessed by any processor 130.

A processor 130 can determine which words of a page have been modified by comparing the twin copy 280 of the page to the working copy 270 for local writes and by comparing the twin copy 280 to the home node copy 290 for remote writes. This comparison is referred to as "diffing" and produces "diffs" or differences between the two copies. In the present invention diffing is performed on both outgoing and incoming operations and is accomplished by performing an exclusive-or operation at a bit level. Other diffing techniques could alternatively be used if so desired.

Referring now to FIGS. 3 through 6, there is illustrated a flow diagram describing the method of operation of one embodiment of the present invention by a processor 130. Home node copies of each page associated with the shared memory are initially assigned to local memories 150 of nodes 110 in a round robin fashion at step 400, and a selected program is run at step 410. As processors access the home node copies in response to execution of the program, the home nodes are reassigned to the local memory of a node requesting access of a page at step 420. As the program progresses, fault operations, release operations and acquire operations are encountered. A fault operation comprises either a read or a write access of a page by a processor 130 that is not associated with a home node of the page. A release operation involves notifying all processors 130 that changes have been made to a page such that the other processors know their copy of the page is out of date. A release operation further involves placing the changes in the home node copy of the changed page such that the changes may be accessed by other processors. An acquire operation involves collecting all the changes to a page and discarding old copies not reflecting these changes. Inquiry step 430 determines the type of operation.

If the operation is determined to be a release operation at inquiry step 430, the releasing processor flushes all modified non-exclusive pages to the home node copy (i.e., forward local modifications to home node copy) by first comparing at step 440 the differences between the working copies and the twin copies of the affected page. The releasing processor indicates to other processors that it has modifications to make to the home node copy by setting at. step 450 the difference bit 254 within the second level directory associated with the page. The releasing processor determines at inquiry step 460 whether the affected home node copy is in the process of eviction or migration from a. current home node by checking the migrating bit 259 and the eviction bit 258 associated with the home node copy of the page. If the migrating and evicting bits 259, 258 do not indicate a migration or an eviction, the releasing processor writes the differences of the twin copy into the home node copy at step 470, clears the difference bit 254 at step 480, sends write notices to any nodes which have copies of the affected pages at step 495, and returns to step 430 to monitor for a fault or release.

If inquiry step 460 determines that the migrating bit 259 or the evicting bit 258 are set, the releasing processor clears at step 490 the difference bit 254 and waits for the migrating and eviction bits to clear at step 500. Once the migrating and evicting bits 295, 258 clear, the releasing processor again attempts to write the differences into the home node copy 290 by returning to step 450.

If inquiry step 430 determines that a fault operation is being executed, the faulting processor determines whether it needs to fetch the affected page at step 510. If a fetch operation is required, the faulting processor determines at step 520 if sufficient memory exists within which to store the fetched page, and if sufficient memory is available fetches the page at step 530. After fetching the page, the faulting processor determines at step 540 if a twin copy of the fetched page exists within the fetching node. If a twin copy does not exist, the faulting processor copies at step 550 the fetched page into a working copy of the page. If a twin copy exists, the faulting processor compares at step 560 the home node copy of the page to the twin copy of the page and writes at step 570 the differences determined by the comparison into the twin copy and the working copy.

If the faulting processor determines a fetch operation is not needed at inquiry step 510 and after writing determined differences at step 570, the faulting processor at inquiry step 580 determines whether the detected fault operation is a write fault. If the fault operation is a write fault, the faulting processor determines at step 590 whether it is located at the home node for the page. If the faulting processor is not located at the home node for the page, the faulting processor indicates that it is migrating the home node copy of the page from its current node location to the local memory of the node of the faulting processor bar setting at step 610 the migrating bit associated with the page to one.

The faulting processor determines at inquiry step 620 if any other processors have detected differences which must be written into the home node copy of the page by checking the difference bits 254 associated with the page at the other nodes at step 620. It also checks if the current home is actively writing the page. If any set difference bits associated with the page are detected or the home node is writing the page, the faulting processor abandons the migration and clears the migrating bit at step 650. The purpose of the abandoned migration was to move the home node copy closer to the faulting processor and reduce remote accesses by the faulting processor and increase efficiency.

However, the existence of differences created by another processor, indicates that another processor other than the faulting processor is accessing the page, and therefore, a migration would not increase efficiency. If it is determined at inquiry step 620 that no difference bits are set and the home node is not writing, the faulting processor designates at step 630 that it is the home node, migrates the page to the node of the faulting processor at step 635, clears the migrating bit 259 at step 640, and returns to step 430. If the migration fails because either the home node is writing or there are difference bits set the faulting processor clears the migrating bit 259 at step 650 and creates a twin copy of the home node copy at step 660, and returns to step 430.

If a determination is made at inquiry step 520 that insufficient memory exists to store the new page, the faulting processor selects a page currently residing in its local memory to evict at step 670. In selecting a page to evict, the faulting processor selects a page meeting one of four criteria, at step 671, the faulting processor looks for a page for which the node associated with the processor has read-only privileges. In this case, the local node does not comprise the home node of the selected page. If such a page is unavailable, the faulting processor next searches at inquiry step 672 for a page which the node associated with the faulting processor has a copy of and has been modified. Again the local node will not be the home node for the selected page. If none of these criteria are met, the faulting processor selects any page at step 673. This order of choice is preferred since it imposes the least overhead, other orders could however be utilized if so desired.

After selecting a page to evict, the faulting processor determines at inquiry step 680 whether it is the home node for the selected page. If the faulting processor is not the home node, inquiry step 690 determines whether the selected page has been modified by the faulting processor. If not, the page is evicted at step 695. If the page has been modified, the faulting processor sets the difference bit 254 for the page at step 700 and determines at inquiry step 710 if the home node copy of the selected page is migrating or being evicted by checking the migrating and evicting bits 259, 258 of the home node copy of the page. If the home node copy is migrating or evicting, the faulting processor clears the difference bit 254 for the page at step 720 and waits for the migrating and evicting bit to clear at step 730. Once the migrating/evicting bit clears control returns to step 700. If inquiry step 710 determines that the migrating and evicting bits are not set, the faulting processor writes the differences into the home node copy at step 740, clears the difference bit of the page at step 750 and removes the page from its local memory at step 760.

If inquiry step 680 determines that the faulting processor is the home node for the selected page, the faulting processor indicates that the home node copy is being evicted by setting at step 770 the evicting bit 258 of the page. The faulting processor waits at step 780 for any difference or fetch bits for the selected page to clear and selects at step 790 a new home node at random for the page. Query step 795 checks to see if no new home node is found. If no new home is found the processor writes the selected page to disk at step 796 and continues with step 820. If a new home is found the faulting processor writes at step 800 the page to the new home node, updates the first level directory home processor ID 257 with the new home node location at step 810, clears the evicting bit at step 820 for the page and removes the selected page from its local memory at step 830.

Following the removal of a page at either step 695, 760 or 830, the faulting processor performs a fetch operation and indicates the occurrence of the fetch operation by setting a fetch bit at step 850. The faulting processor determines at inquiry step 860 whether the home node copy of the page is being evicted or is migrating by checking the evicting and migrating bits. If the home node copy is not being evicted and is not migrating then the page is retrieved at step 870 from the home node and a return is made to step 580. Otherwise, the faulting processor clears the fetch bit at step 880 and waits for the evicting and migrating bits to clear at step 890. When the evicting and migrating bits are clear, the faulting processor resumes with step 850.

If an acquire operation is detected at Step 430, write notices are distributed at step 900 to processors containing copies of the changed page. As the write notices are detected by the processor containing copies of the changed page, the most recent write notice time stamp for the page is updated with the arrival time stamp of the write notice in the second level directory 210 of the local memory 150 associated with the affected processor. After distributing the write notices, the affected processor 130 processes the write notices for each affected page. The affected processor 130 compares at step 905 the most recent write notice time stamp with the last fetch time stamp to determine which is greater. If the most recent write notice time stamp is greater than the last fetch time stamp, the acquiring processor 130 invalidates the page at step 910, and a return is made to step 430. Otherwise, the affected processor 130 does nothing and a return to step 430 since no changes have been made to the page since the last fetch operation.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method using a processor for providing additional memory storage within a local node associated with a shared memory system, comprising the steps of:

determining, upon it being resolved that a fetch operation is required, whether sufficient local memory exists in the local node for receiving via the fetch operation a copy of a first group of data;

selecting a second group of data for removal from the local memory, upon it being determined that insufficient local memory exists for receiving the first group of data, such that no data will be lost upon removal of the second group of data from the local memory;

determining if any active operation involving the second group of data is occurring;

removing the selected second group of data from the local memory upon it being determined that no active operation involving the second group of data is occurring; and fetching the copy of the first group of data from a home node location of the first group of data within the shared memory system to the local memory.

2. The method of claim 1, wherein the step of selecting further includes the steps of:
determining if a particular group of data exists for which the local node has read-only privileges such that the local node is not a home node of the particular group of data; and
selecting the particular group of data, if it exists, as the second group of data.

3. The method of claim 1, wherein the step of selecting further includes the steps of:
determining if a modified copy of a group of data exists in the local memory, wherein the local node is not a home node of the modified copy of the group of data; and
selecting the modified copy of the group of data, if it exists, as the second group of data.

4. The method of claim 1, wherein the step of selecting further includes the step of:
selecting any group of data as the second group of data.

5. The method of claim 1, further comprising the step of:
determining if the local node is the home node of the selected second group of data.

6. The method of claim 5 further comprising the step of:
determining if the selected second group of data has been modified if the local node is not the home node; and
writing the modifications to a home node for the second group of data if the home node copy if not in a process of changing locations.

7. The method of claim 6 further comprising the steps of:
writing the second group of data to a new home node upon completion of any active operation involving the second group of data;
updating directory information to indicate the new home node for the second group of data.

8. The method of claim 5 further comprising the steps of:
setting directory information indicating an intent to move the home node location of the second group of data; and
waiting for completion of all active operations involving the second group of data prior to moving the home node location.

9. An article of manufacture for providing additional memory storage area within a local node of a shared memory system, comprising:
a processor; and
a computer readable medium embodying program code configured to cause the processor to:
determine, upon it being resolved by the processor that a fetch operation is required, whether sufficient local memory exists in the local node for receiving via the fetch operation a copy of a first group of data;
select a second group of data for removal from the local memory, upon it being determined that insufficient local memory exists for receiving the first group of data, such that no data will be lost upon removal of the second group of data from the local memory;
determine if any active operation involving the second group of data is occurring;
remove the selected second group of data from the local memory upon it being determined that no active operation involving the second group of data is occurring; and
fetch the copy of the first group of data from a home node location of the first group of data within the shared memory system to the local memory.

10. The article of manufacture of claim 9, wherein the program code is further configured to cause the processor to:
determine if a local memory contains a particular group of data for which the local node has read-only privileges such that the local node is not a home node of the particular; and
select the particular group of data, if it exists, as the second group of data.

11. The article of manufacture of claim 9, wherein the program code is further configured to cause the processor to:
determine if a modified copy of a group of data exists in the local memory, wherein the local node is not a home node of the modified copy of the group of data; and
select the modified copy of the group of data, if it exists, as the second group of data.

12. The article of manufacture of claim 9, wherein the program code is further configured to cause the processor to:
select any group of data as the second group of data.

13. The article of manufacture of claim 9, wherein the program code is further configured to cause the processor to:
determine if the local node is the home node of the selected second group of data.

14. The article of manufacture of claim 13, wherein the program code is further configured to cause the processor to:
determine if the selected second group of data has been modified if the local node is not the home node; and
write the modifications to the home node for the second group of data if the home node copy is not in a process of relocation.

15. The article of manufacture of claim 14, wherein the program code is further configured to cause the processor to:
write the second group of data to a new home node upon completion of any active operations involving the second group of data; and
update directory information to indicate the new home node for the second group of data.

16. The article of manufacture of claim 13, wherein the program code is further configured to cause the processor to:
set directory information indicating an intent to move the home node location of the second group of data; and
wait for completion of all active operations involving the second group of data prior to moving the home node location of the second group of data.

17. A shared memory system for a plurality of nodes, comprising:
a local memory associated with each node for storing a plurality of groups of data;
a directory associated with each node for containing status information for the plurality of groups of data, wherein the status information includes;
a read-only bit indicating whether the associated node includes a copy of a group of data having read-only privileges;
a read-write bit indicating whether the associated node includes a copy of a group of data having read-write privileges;
an evicting bit indicating whether the home node of the group of data is moving as a result of an eviction; and
a migrating bit indicating whether a home node is moving for reasons other than eviction;
a communications network enabling communication between the nodes; and
at least one processor associated with each node configured to determine, upon resolving that a fetch operation is required, whether sufficient local memory exists in a local node to which the at least one processor is associated for receiving via the fetch operation a copy of a first group of data, select a second group of data for removal from the local memory upon it being determined that insufficient memory exists for receiving the first group of data, such that no data will be lost upon removal of the second group of data, remove the selected second group of data from the local memory, and fetch the copy of the first group of data to the local memory.

18. The shared memory system of claim 17, wherein the processor is further configured to determine if a particular group of data exists for which the local node has read-only privileges such that the local node is not a home node of the particular group of data and selects the particular group of data, if it exists, as the second group of data.

19. The shared memory of claim 17, wherein the processor is further configured to determine if a modified copy of a group of data exists in the local memory, wherein the local node is not a home node of the modified copy of the group of data and select the modified copy of the group of data, if it exists, as the second group of data.

20. The shared memory system of claim 17, wherein the processor is further configured to select any group of data as the second group of data.

21. The shared memory system of claim 17, wherein the processor is further configured to determine if the local node is the home node for the selected second group of data.

22. The shared memory system of claim 21, wherein the processor is further configured to determine if the selected second group of data has been modified if the local node is not the home node and write the modifications to a home node for the second group of data if the home node is not in a process of relocation.

23. The shared memory system of claim 22, wherein the processor is further configured to write the modifications to the home node for the second group of data once the home node is not in the process of relocation.

24. The shared memory system of claim 23, wherein processor is further configured to determine if any active operations involving the second group of data are occurring, write the second group of data to a new home node upon completion of any active operations involving the second node, and update directory information to indicate the new home node for the second group of data.

25. The shared memory system of claim 24, wherein the processor is further configured to set the directory information within the directory to indicate an intent to move the home node location of the second group of data and wait for completion of all active operations involving the second group of data.

26. The shared memory system of claim 17, wherein the group of status information further includes:
- a difference bit indicating whether the associated node is writing differences into a group of data; and
- a fetch bit indicating whether the associated node is attempting to fetch a group of data from a home node.

27. A shared memory system for a plurality of nodes, comprising:
- a local memory associated with each node for storing a plurality of groups of data;
- a directory associated with each node for containing status information for the plurality of groups of data, wherein the status information further includes:
  - a read-only bit indicating whether the associated node includes a copy of a group of data having read-only privileges;
  - a read-write bit indicating whether the associated node includes a copy of a group of data having read-write privileges;
  - a difference bit indicating whether the associated node is writing differences into a group of data;
  - a fetch bit indicating whether the associated node is attempting to fetch a group of data from a home node;
  - an evicting bit indicating whether a home node of the group of data is moving as a result of an eviction; and
  - a migrating bit indicating whether the home node is moving for reasons other than an eviction;
- a communications network enabling communication between the nodes; and
- at least one processor associated with each node configured to determine, upon resolving that a fetch operation is required, whether sufficient local memory exists in a local node to which the at least one processor is associated for receiving via the fetch operation a copy of a first group of data, select a second group of data for removal from the local memory, upon it being determined that insufficient memory exists for receiving the first group of data, such that no data will be lost upon removal of the second group of data, remove the selected second group of data from the local memory, and fetch the copy of the first group of data to the local memory.

* * * * *

UNITED STATES PATENT AND TRADEMARK OFFICE
CERTIFICATE OF CORRECTION

PATENT NO.     : 6,298,419 B1
DATED          : October 2, 2001
INVENTOR(S)    : Kontothanassis et al.

It is certified that error appears in the above-identified patent and that said Letters Patent is hereby corrected as shown below:

Title page,
Item [56], OTHER PUBLICATIONS, add:
-- Scheurich, et al., IEEE Transactions on Computers, Vol. 38, No. 8, "Dynamic page Migration in Multiprocessors with Distributed Global Memory" --

Column 9,
Line 29, reads "group of data if the home node copy if not in a process" it should read -- group of data if the home node copy is not in a process --

Signed and Sealed this

Twenty-fifth Day of March, 2003

JAMES E. ROGAN
*Director of the United States Patent and Trademark Office*